(12) United States Patent
Newman

(10) Patent No.: US 9,955,711 B2
(45) Date of Patent: May 1, 2018

(54) METHOD AND APPARATUS FOR INCREASED PRODUCT THROUGHPUT CAPACITY, IMPROVED QUALITY AND ENHANCED TREATMENT AND PRODUCT PACKAGING FLEXIBILITY IN A CONTINUOUS STERILIZING SYSTEM

(75) Inventor: Paul Bernard Newman, Fallbrook, CA (US)

(73) Assignee: JBT Food & Dairy Systems B.V., Amsterdam (NL)

( * ) Notice: Subject to any disclaimer, the term of this patent is extended or adjusted under 35 U.S.C. 154(b) by 1281 days.

(21) Appl. No.: 13/471,653

(22) Filed: May 15, 2012

(65) Prior Publication Data
US 2012/0294998 A1    Nov. 22, 2012

Related U.S. Application Data

(60) Provisional application No. 61/488,220, filed on May 20, 2011.

(51) Int. Cl.
*A23L 3/02* (2006.01)

(52) U.S. Cl.
CPC ............... *A23L 3/02* (2013.01); *A23L 3/025* (2013.01)

(58) Field of Classification Search
CPC ........................................................ A23L 3/02
See application file for complete search history.

(56) References Cited

U.S. PATENT DOCUMENTS

| | | |
|---|---|---|
| 1,419,139 A | 6/1922 | Hunter |
| 1,868,996 A | 7/1932 | Sharp |
| 1,923,421 A | 8/1933 | Chapman |
| 2,556,385 A | 6/1951 | Allan |

(Continued)

FOREIGN PATENT DOCUMENTS

| | | |
|---|---|---|
| DE | 881896 | 7/1953 |
| DE | 2334443 | 2/1975 |

(Continued)

OTHER PUBLICATIONS

U.S. Appl. No. 13/449,718, "Non-Final Office Action", dated Nov. 22, 2013, 12 pages.

(Continued)

*Primary Examiner* — Viren A Thakur
*Assistant Examiner* — Thanh H Nguyen
(74) *Attorney, Agent, or Firm* — Christensen O'Connor Johnson Kindness PLLC

(57) ABSTRACT

Apparatus and method for enhancing the flexibility and increasing throughput capacity while reducing cost and improving the quality of food and drink products within a continuous sterilization system using novel product carriers, in conjunction with unique user controllable product rotation and agitation features, capable of handling novel as well as existing product containers, are described. A further aspect of the invention is a property of the uniquely designed product carrier to accommodate and optimally orientate said product containers. A final aspect of the invention is the further capability of individual product carriers to undertake (Continued)

any user-defined processing program including product pasteurization or product stabilization or product sterilization within an essentially continuous sterilization system.

18 Claims, 3 Drawing Sheets

(56) References Cited

U.S. PATENT DOCUMENTS

| | | |
|---|---|---|
| 2,595,708 A | 5/1952 | Salfisberg et al. |
| 2,633,284 A | 3/1953 | Moffett et al. |
| 2,660,512 A | 11/1953 | Webster |
| 2,806,423 A | 9/1957 | Van Der Winden |
| 2,818,012 A | 12/1957 | Webster |
| 2,870,954 A | 1/1959 | Kulesza |
| 2,968,232 A | 1/1961 | Carvallo |
| 2,976,988 A | 3/1961 | Schneider |
| 3,088,180 A | 5/1963 | Lauterbach |
| 3,286,619 A | 11/1966 | Lee |
| 3,377,173 A | 4/1968 | Winden |
| 3,394,793 A | 7/1968 | Reimers et al. |
| 3,407,721 A | 10/1968 | Carvallo |
| 3,469,988 A | 9/1969 | Yawger |
| 3,478,677 A | 11/1969 | Mencacci |
| 3,545,985 A | 12/1970 | Mencacci et al. |
| 3,637,132 A | 1/1972 | Gray |
| 3,927,976 A * | 12/1975 | Reimers ............... A23L 3/045 422/105 |
| 3,960,670 A | 6/1976 | Pflug |
| 4,067,691 A | 1/1978 | McGady et al. |
| 4,116,117 A | 9/1978 | Bogaard |
| 4,196,225 A * | 4/1980 | Mencacci ............... A23L 3/003 426/233 |
| 4,206,299 A | 6/1980 | Yamazaki et al. |
| 4,295,566 A | 10/1981 | Vincek |
| 4,389,371 A | 6/1983 | Wilson et al. |
| 4,396,582 A | 8/1983 | Kodera |
| 4,476,263 A | 10/1984 | Owens |
| 4,522,015 A | 6/1985 | Hildebolt |
| 4,547,383 A | 10/1985 | Goldhahn |
| 4,631,115 A | 12/1986 | Berg et al. |
| 4,661,325 A * | 4/1987 | Noro .................. A23L 3/04 414/157 |
| 4,739,699 A | 4/1988 | Nelson et al. |
| 4,816,269 A | 3/1989 | Nelson et al. |
| 4,861,559 A | 8/1989 | Sugisawa et al. |
| 4,990,347 A | 2/1991 | Rasmussen et al. |
| 5,141,662 A | 8/1992 | Dexheimer et al. |
| 5,160,755 A * | 11/1992 | Mignogna ............... A23L 3/00 422/307 |
| 5,218,829 A | 6/1993 | DeJarnette |
| 5,240,725 A | 8/1993 | Akamatsu et al. |
| 5,283,033 A | 2/1994 | Dodrill |
| 5,307,985 A | 5/1994 | Beizermann |
| 5,351,828 A | 10/1994 | Becker et al. |
| 5,368,093 A | 11/1994 | Takehashi |
| 5,370,174 A * | 12/1994 | Silvestrini ............... A23L 3/001 165/109.1 |
| 5,478,990 A | 12/1995 | Montanari et al. |
| 5,484,547 A | 1/1996 | Mendoza |
| 5,696,686 A | 12/1997 | Sanka et al. |
| 5,711,984 A | 1/1998 | Woodward et al. |
| 5,747,085 A | 5/1998 | Veltman et al. |
| 5,759,486 A | 6/1998 | Peterson |
| 5,839,832 A | 11/1998 | Hagino |
| 5,857,312 A | 1/1999 | Walden |
| 5,872,359 A | 2/1999 | Stewart et al. |
| 5,894,929 A | 4/1999 | Kai et al. |
| 6,017,572 A | 1/2000 | Meyer |
| 6,025,189 A | 2/2000 | Bolea et al. |
| 6,071,474 A | 6/2000 | Martinsen et al. |
| 6,086,782 A | 7/2000 | Hsu et al. |
| 6,090,425 A | 7/2000 | Samimi |
| 6,096,358 A | 8/2000 | Murdick et al. |
| 6,148,249 A | 11/2000 | Newman |
| 6,251,337 B1 | 6/2001 | Kane |
| 6,389,828 B1 | 5/2002 | Thomas |
| 6,416,711 B2 | 7/2002 | Weng |
| 6,440,361 B2 | 8/2002 | Weng |
| 6,472,008 B2 | 10/2002 | Weng |
| 6,868,873 B2 | 3/2005 | Frisk |
| 7,008,501 B2 | 3/2006 | Lohwasser et al. |
| 7,008,659 B1 | 3/2006 | Ono |
| 7,141,102 B2 | 11/2006 | Fukutani et al. |
| 7,178,555 B2 | 2/2007 | Engel et al. |
| 7,396,521 B2 | 7/2008 | Hwang |
| 7,452,561 B2 | 11/2008 | Newman |
| 7,475,786 B2 | 1/2009 | McVay |
| 7,533,512 B2 | 5/2009 | Levati et al. |
| 7,543,455 B2 | 6/2009 | Chen |
| 7,666,457 B1 | 2/2010 | Lang et al. |
| 7,846,486 B2 | 12/2010 | Camu |
| 7,880,887 B2 | 2/2011 | Olson et al. |
| 7,985,349 B2 | 7/2011 | Yang et al. |
| 8,181,474 B2 | 5/2012 | Chen |
| 8,206,607 B2 | 6/2012 | Evans et al. |
| 8,479,532 B2 | 7/2013 | Cocchi et al. |
| 8,575,525 B2 | 11/2013 | Mackay et al. |
| 2001/0041150 A1 | 11/2001 | Weng |
| 2003/0211212 A1 | 11/2003 | Belongia et al. |
| 2005/0040251 A1 | 2/2005 | Daly |
| 2005/0123435 A1 | 6/2005 | Cutler et al. |
| 2005/0253109 A1 | 11/2005 | Tran et al. |
| 2006/0038159 A1 | 2/2006 | Fukutani et al. |
| 2006/0051639 A1 | 3/2006 | Yang et al. |
| 2007/0122335 A1 | 5/2007 | Hwang |
| 2007/0160494 A1 | 7/2007 | Sands |
| 2007/0275178 A1 | 11/2007 | Nishi et al. |
| 2007/0293980 A1 | 12/2007 | Gudjonsson et al. |
| 2008/0048147 A1 | 2/2008 | Eaton |
| 2008/0152537 A1 | 6/2008 | Wild et al. |
| 2008/0311259 A1 | 12/2008 | Singh et al. |
| 2008/0315152 A1 | 12/2008 | Daly |
| 2009/0057607 A1 | 3/2009 | Evans et al. |
| 2009/0081417 A1 | 3/2009 | Schmal et al. |
| 2009/0142223 A1 | 6/2009 | Hyde et al. |
| 2009/0169693 A1 | 7/2009 | Hoffman |
| 2009/0178928 A1 | 7/2009 | Groos et al. |
| 2009/0191318 A1 | 7/2009 | Cocchi et al. |
| 2009/0238937 A1 | 9/2009 | Yamazaki et al. |
| 2009/0301118 A1 | 12/2009 | Chen |
| 2009/0301119 A1 | 12/2009 | Chen |
| 2010/0006796 A1 | 1/2010 | Yang et al. |
| 2010/0006798 A1 | 1/2010 | Yang et al. |
| 2010/0012147 A1 * | 1/2010 | Lu ............... A61L 2/10 134/1 |
| 2010/0119670 A1 | 5/2010 | Mazzariello |
| 2010/0173060 A1 | 7/2010 | Perren et al. |
| 2010/0178404 A1 | 7/2010 | Yoakim et al. |
| 2011/0104350 A1 | 5/2011 | Clüsserath et al. |

FOREIGN PATENT DOCUMENTS

| | | |
|---|---|---|
| DE | 102009018489 | 10/2010 |
| EP | 362975 | 4/1990 |
| EP | 808631 | 11/1997 |
| EP | 990689 | 4/2000 |
| EP | 1359097 | 11/2003 |
| EP | 1964785 | 9/2008 |
| EP | 2177116 | 4/2010 |
| EP | 2223618 | 9/2010 |
| EP | 2574243 B1 | 4/2014 |
| GB | 1206061 A | 9/1970 |
| GB | 2285126 | 6/1995 |
| GB | 2408440 | 6/2005 |
| GB | 2427601 | 1/2007 |
| GB | 2449288 | 11/2008 |
| JP | 2007-161807 | 6/2007 |
| JP | 2011012166 | 1/2011 |
| WO | 198804145 | 6/1988 |
| WO | WO 96/11592 A1 | 4/1996 |
| WO | 0027227 | 5/2000 |
| WO | 0027229 | 5/2000 |

(56) References Cited

FOREIGN PATENT DOCUMENTS

| WO | 2002021928 | 3/2002 | | |
|---|---|---|---|---|
| WO | 200237975 | 5/2002 | | |
| WO | 2003018706 | 3/2003 | | |
| WO | 0417741 | 3/2004 | | |
| WO | 2006092376 | 9/2006 | | |
| WO | WO 2007/020469 | 2/2007 | | |
| WO | 199807452 | 2/2008 | | |
| WO | 2008093367 | 8/2008 | | |
| WO | WO 2008119991 A1 * | 10/2008 | ............ | A23L 3/001 |
| WO | 2009005767 | 1/2009 | | |
| WO | 2010092360 | 8/2010 | | |

OTHER PUBLICATIONS

U.S. Appl. No. 13/449,718, "Response to Restriction Requirement", dated Oct. 28, 2013, 5 pages.
U.S. Appl. No. 13/449,718, "Restriction Requirement", dated Sep. 26, 2013, 6 pages.
U.S. Appl. No. 13/450,693, "Non-Final Office Action", dated Nov. 8, 2013, 32 pages.
U.S. Appl. No. 13/450,693, "Response to Non-Final Office Action", dated Mar. 7, 2014, 30 pages.
U.S. Appl. No. 13/450,693, "Response to Restriction Requirement", dated Oct. 17, 2013, 7 pages.
U.S. Appl. No. 13/450,693, "Restriction Requirement", dated Sep. 17, 2013, 6 pages.
U.S. Appl. No. 13/452,207, "Non-Final Office Action", dated Feb. 14, 2014, 6 pages.
U.S. Appl. No. 13/464,997, "Non-Final Office Action", dated Sep. 12, 2013, 11 pages.
U.S. Appl. No. 13/464,997, "Response to Non-Final Office Action", dated Jan. 13, 2014, 22 pages.
U.S. Appl. No. 13/464,997, "Response to Restriction Requirement", dated May 1, 2013, 6 pages.
U.S. Appl. No. 13/464,997, "Restriction Requirement", dated Apr. 5, 2013, 13 pages.
U.S. Appl. No. 13/624,411, "Non-Final Office Action", dated Mar. 11, 2014, 8 pages.
U.S. Appl. No. 13/624,411, "Response to Restriction Requirement", dated Feb. 19, 2014, 8 pages.
U.S. Appl. No. 13/624,411, "Restriction Requirement", dated Dec. 19, 2013, 6 pages.
U.S. Appl. No. 61/079,185, "Continuous Monitoring, Measuring and Controlling the Properties of Artificial Casings with Special Reference to Cellulose and Fibrous Casings", filed Mar. 2009.
U.S. Appl. No. 61/182,696, "Printing of Data, Logos and Coded or Uncoded Information on Wet Surfaces and High Moisture Content, Natural, Unprocessed and Processed Foodstuffs.", filed May 2009.
U.S. Appl. No. 61/182,731, "Continuous Monitoring, Measuring and Controlling the Properties of Webs, Films and Tubular Casings with Special Reference to Cellulose and Fibrous Casings", filed May 2010.
U.S. Appl. No. 61/478,190, "Adaptive Packaging for Food Processing Systems", filed Apr. 22, 2011.
U.S. Appl. No. 61/478,491, "Apparatus and Method for Optimizing and Controlling food processing performance especially in continuous sterilizing or pasteurizing systems", filed Apr. 23, 2011.
U.S. Appl. No. 61/478,665, "Accelerating, Optimizing and Controlling product cooling in food processing systems especially continuous sterilizing or pasteurizing systems", filed Apr. 25, 2011.
U.S. Appl. No. 61/480,521, "Novel Continuous and Flexible food and drink processing technology", filed Apr. 29, 2011.
U.S. Appl. No. 61/483,923, "Method and Apparatus for Enhanced Performance of a Conventional Continuous Sterilizing System", filed May 9, 2011.
U.S. Appl. No. 61/488,220, "Enhanced Product Capacity, Quality and Handling Flexibility Within a Conventional Continuous Food Processing System", filed May 20, 2011.
U.S. Appl. No. 61/540,010, "Novel Thermal Transfer Media for Processing of Food and Drink Products", filed Sep. 28, 2011.
Ball, "Foundation of Food Process Calculation Methods", Sterilization in Food Technology, 1992, pp. 124-125.
Ball et al., "Heating Curve-Simple Logarithmic Temperature Rise", Sterilization in Food Technology, Theory, Practice and Calculations, 12:313-329.
Berlinet et al., "Effect of Pulp Redaction and Pasteurization on the Release of Aroma Compounds in Industrial Orange Juice", J. Food Sci., vol. 72, No. 8, Oct. 2007, pp. 5535-5543.
Best, "Physical Parameters of Cooling in Cryonics".
Bichier et al., "Thermal Processing of Canned Foods Under Mecheanical Agitation", Asme Heat Transfer Div Publ HTD; American Society of Mechanical Engineers, Heat Transfer in Food Processing, Abstract, 1993.
Browning et al., "Selecting and Maintaining Glycol Based Heat Transfer Fluids", Facilities Engineering Journal, Sep. 2010, pp. 16-18.
Casolari, Food Microbiology, 1994, vol. 11, pp. 75-84.
Chang et al., "Modeling Heat Transfer During Oven Roasting of Unstuffed Turkeys", Journal of Food Science, 1998, 63(2):257-261.
Chang et al., "Heat Transfer and Simulated Sterilization of Particulate Solids in a Continously Flowing System", J. Food Sci., 1989, vol. 54(4):1017-1023 & 1030.
Chen et al., "Modeling Coupled Heat and Mass Transfer for Convection Cooking of Chicken Patties", Journal of Food Engineering, 1999, 42:139-146.
Clausing, "Numerical Methods in Heat Transfer", Lectures on Advanced Heat Transfer, 1989, 157-181.
Conway et al., "Commercial Portion-Controlled Foods in Research Studies: How Accurate are Label Weights", Journal of the American Dietetic Association, vol. 104, No. 9, Sep. 2004.
Datta et al., "Computer-Based Retort Control Logic for On-Line Correction of Process Deviations", J. Food Sci., 1986, 51(2):480-483 & 507.
Denys et al., "Evaluation of Process Deviations, Consisting of Drops in Rotational Speed, During Thermal Processing of Foods In Rotary Water Cascading Retorts", J. Food Eng., 1996, 30:327-338.
Dias et al., "Anhydrous Bioethanol Production Using Bioglycerol: Simulaiton of Extractive Distillation Process", European Symposium on Computer-Aided Process Engineering, 2009, 519-524.
Downing et al., "Canning of Marine Products", A Complete Course in Canning and Related Processes, 1996, Book III; 312-322.
EP12164764.8, "European Search Report", dated Aug. 16, 2012, 11 pages.
EP12164764.8, "Office Action", dated Oct. 8, 2013, 5 pages.
EP12164764.8, "Response to European Search Report", dated Apr. 22, 2013, 42 pages.
EP12164764.8, "Response to Office Action", dated Feb. 10, 2014, 38 pages.
EP12164859.6, "European Search Report", dated Aug. 21, 2012, 5 pages.
EP12164859.6, "Office Action", dated Jul. 19, 2013, 3 pages.
EP12164859.6, "Response to European Search Report", dated Apr. 22, 2013, 30 pages.
EP12164859.6, "Response to Office Action", dated Nov. 7, 2013, 48 pages.
EP12165126.9, "Communication Pursuant to Rule 71(3)", dated Jan. 9, 2014, 31 pages.
EP12165126.9, "European Search Report", dated Jul. 23, 2012, 8 pages.
EP12165126.9, "Office Action", dated Aug. 2, 2013, 4 pages.
EP12165126.9, "Response to European Search Report", dated Jun. 19, 2013, 33 pages.
EP12165126.9, "Response to Office Action", dated Dec. 9, 2013, 50 pages.
EP12165959.3, "European Search Report", dated Jul. 24, 2012, 6 pages.
EP12165959.3, "Response to European Search Report", dated Apr. 26, 2013, 39 pages.
EP12167138.2, "Decision to Grant", dated Dec. 12, 2013, 2 pages.
EP12167138.2, "European Search Report", dated Aug. 17, 2012, 6 pages.

(56) References Cited

OTHER PUBLICATIONS

EP12167138.2, "Response to European Search Report", dated May 14, 2013, 49 pages.
EP12168270.2, "European Search Report", dated Sep. 19, 2012, 4 pages.
EP12168270.2, "Response to European Search Report", dated May 21, 2013, 63 pages.
EP12186224.7, "Communication Under Rule 71(3)", dated Dec. 19, 2013, 29 pages.
EP12186224.7, "European Search Report", dated Dec. 20, 2012, 6 pages.
EP12186224.7, "Response to European Search Report", dated Oct. 1, 2013, 34 pages.
Erdogdu et al., "Modeling of Heat Conduction in Elliptical Cross Section: 1 Development and Testing of the Model", Journal of Food Eng., 1998, vol. 38, 223-239.
Fahloul et al., "Measurements and Predictive Modelling of Heat Fluxes in Continuous Baking Ovens", Journal of Food Engineering, 1995, 26:469-479.
Fastag et al., "Variable Control of a Batch Retort and Process Simulation for Optimization Studies", J. of Food Proces Engg., Nov. 1996, 19:1-14.
Fellows, "Food Processing Technology: Principles and Practice, Chapter 12: Heat Sterilisation", second edition, 2000, 262.
Giannoni-Succar et al., "Correction Factor of Deviant Thermal Processes Applied to Packaged Heat Conduction Food", J. Food Sci, 1982, 47(2):642-646.
Gill et al., "Simulation of Ethanol Extractive Distilation with a Glycols Mixture as Entrainer", 2nd Mercosur Congress on Chemical Engineering, 2005.
Gill et al., "Computerized Control Strategies for a Steam Retort", Journal of Food Engineering, 1989, vol. 10 135-154.
Glycerine NPL, "http://www.engineeringtoolbox.com/glycerine-boiling-freezing-points-d_1590. html, 2011".
Hayakawa et al., "Estimating Heat Processes in Canned Foods", Ashrae Journal, Sep. 1975, 36-37.
http://www.artisanind.com/ps/equ, "The Artisan Rototherm", Artisan Industries Inc., Available at least as early as May 8, 2012.
http://www.sciencemadness.org/ta, "(comments by Sauron on pp. 4-5)", Jan. 19, 2007.
Huang et al., "Meatball Cooking-Modeling and Simulation", Journal of Food Engineering, 1995, 24:87-100.
Jiang et al., "Desilication from Illite by Thermochemical Activation", Oct. 2004, vol. 14, No. 5, 1000-1005.
Lanoiselle et al., "Predicting Internal Temperature of Canned Foods During Thermal Processing Using a Linear Recursive Model", J. Food Sci., 1995, 60(4):833-840.
Larkin et al., "Experimental Errors Associated with the Estimation of Thermal Diffusivity from Thermal Process Data", J. Food Sci, 1987, 52(2):419-428.
Liu, "Modelling of Thermal Properties of Food", Handbook of Food Science, Technology and Engineering, 2006, vol. 3 Chapter 110.
Manson, "Evaluating Complex Deviations-Hydrostatic Sterilizers", TechniCAL, Inc., Chapter 12:12-1-12.4.
Manson, "Evaluation of Lethality and Nutrient Retentions of Conduction-Heating Foods in Rectangular Containers", Food Technology, 1970, 24(11):109-113.
Martin et al., "Propylene Glycol Based Heat Transfer Fluids", http://www.engineeringtoolbox.com/propylene-glycol-d_363.html, 2011.
McConnell, "Effect of a Drop in Retort Temperature Upon the Lethality of Processes for Convection Heating Products", Food Tech., Feb. 1952, vol. 6, No. 2, 76-78.
Meng et al., "Heat Transfer to Canned Particulates in High-Viscosity Newtonian Fluids During Agitation Processing", J. Food Processing and Preservation, 2006, 30:643-658.
Morrison et al., "Glycerol", Dec. 4, 2000, 1-13.
Navankasattusas et al., "Monitoring and Controlling Thermal Processes by On-Line Measurement of Accomplished Lethality", Food Technology, Mar. 1978, 79-83.
Onita et al., "Estimation of the Specific Heat and Thermal Conductivity of Foods Only by Their Classes of Substances Contents (Water, Proteins, Fats, Carbohydrates, Fibers and Ash", Scientifical Researches. Agroalimentary Processes and Technologies, vol. 11, No. 1, 2005, pp. 217-222.
Porter et al., "Non-Newtonian Viscosity of Polymers", J. Appl. Phys., 1961, vol. 32, No. 11, 2326.
Press et al., "Parabolic Interpolation and Brent's Method in One Dimension", Numerical Recipes in Fortran, 395-398.
Rainbow et al., "Effect of Chelating Agents on Accumulation of Cadmium by the Barnacle Semibalanus Balanoides and Complexation of Soluble Cadmium, Zinc and Copper", Marine Ecology 2, 1980, 143-152.
Sahin et al., "The Thermal Properties of Food", Springer Science, Physical Properties of Food, 2006, 107-155.
Simpson et al., "Computer Control of Batch Retort Process Operations", Food Processing Automation, Conference (Proceedings), May 1990.
Teixeira et al., "Computer Control of Batch Retort Operations with On-Line Correction of Process Deviations", Food Technology, Apr. 1982, 85-90.
Teixeira et al., "Computer Optimization of Nutrient Retention in the Thermal Processing of Conduction-Heated Foods", Food Technology, 1969, vol. 23(845):137-142.
Teixeira, "Innovative Heat Transfer Models: From Research Lab to On-Line Implementation", Food Processing Automation II, Proceedings of the 1992 FPEI Conference, May 4-6, 1992, 177-184.
Teixeira et al., "On-Line Retort Control in Thermal Sterilization of Canned Foods", Food Control, 1997, vol. 8 No. 1:13-20.
Thin-Film Drying, LCI Corporation, Available at least as early as May 8, 2012.
Wang et al., "A Mathematical Model of Simultaneous Heat and Moisture Transfer During Drying of Potato", Journal of Food Engineering, 1995, 24:47-60.
Weng et al., "Process Deviation Analysis of Conduction-Heating Canned Foods Processed in a Hydrostatic Sterilizer Using a Mathematical Model", Journal Food Processing Automation IV, 1995, vol. 41(6):368-379.
Weng et al., "The Use of a Time-Temperature-Integrator in Conjunction with Mathematical Modelling for Determining Liquid/Particle Heat Transfer Coefficients", J. Food Engg., 1992, 16:197-214.
Williams, "Modular Sterilization Processing", Allpax Products, Inc.
www.lytron.com/tools-and-technic, "The Best Heat Transfer Fluids for Liquid Cooling", Jul. 14, 2011.
Young et al., "Product Temperature Prediction in Hydrostatic Retorts", Transactions of the ASAE, 1983, vol. 26(1):316-320.
Young et al., "Predicting Product Lethality in Hydrostatic Retorts", Journal of Food Science, 1985, vol. 50:1467-1472.
Zhao et al., "Computer Simulation on Onboard Chilling and Freezing of Albacore Tuna", Journal of Food Science, 1998, vol. 63(5):751-755.
Nelson, "Principles of Aseptic Processing and Packaging", 2010, pp. 3-46, 101-150.
Final Office Action, U.S. Appl. No. 13/464,997, dated May 23, 2014.
Response to Non-Final Office Action, U.S. Appl. No. 13/452,207, filed Jun. 5, 2014.
Decision to Grant, European Patent Application No. 12186224.7, dated Mar. 27, 2014.

\* cited by examiner

METHOD AND APPARATUS FOR INCREASED PRODUCT THROUGHPUT CAPACITY, IMPROVED QUALITY AND ENHANCED TREATMENT AND PRODUCT PACKAGING FLEXIBILITY IN A CONTINUOUS STERILIZING SYSTEM

PRIORITY

This application benefits from the priority date of Provisional Patent Application No. 61/488,220, filed 20 May 2011

REFERENCES CITED

| U.S. patents | | |
|---|---|---|
| 1,419,139 | June 1922 | Hunter |
| 2,806,423 | September 1957 | Van der Winden, |
| 3,469,988 | September 1969 | Yawger |
| 3,478,677 | November 1969 | Mencacci, |
| 3,927,976 | December 1975 | Reimers et al |
| 4,116,117 | September 1978 | Bogaard, |
| 4,196,225 | April 1980 | Menacci |
| 4,990,347 | February 1991 | Rasmussen et al |
| 5,747,085 | May 1998 | Veltman et al |
| 5,857,312 | January 1999 | Walden |
| 6,071,474 | June 2000 | Martinsen et al |
| 6,251,337 | June 2001 | Kane |
| patent application 20090191318 | July 2009 | Cocchi et al |
| patent application 20100178404 | July 2010 | Yoakim et al |

| Foreign Patents | | |
|---|---|---|
| EP application 2177116 | April 2010 | Taguichi et al |

FIELD OF INVENTION

The present invention relates to the substantially continuous cooking and cooling of food and drink products. In particular it relates to cooking such products to either pasteurization or sterilization temperatures under the hydrostatic pressure of a liquid for improving cooking times, product quality and organoleptic properties while ensuring necessary food safety. It further relates to incorporating the ability to process such products contained in alternative packaging.

BACKGROUND OF THE INVENTION

It is well-known to those skilled in the art that whenever a product is heated or cooled, there are a large number of variables that influence the rate at which this happens. The major constraints are usually the thermal diffusivity and thermal effusivity properties of the product being treated. In many instances, there is more than sufficient energy surrounding the product, the constraint is the rate at which the product can absorb the energy and internally distribute it. This in turn e affects product properties and ultimately determines product quality.

The variability of food properties and product quality as a consequence of variation in heat transfer through food is well-known. In many food products, the issues have far-reaching commercial consequences and have received significant attention e.g. coffee brewing (US20100178404) and ice cream and whipped frozen products (US20090191318)
With food and drink products this is principally shown in its organoleptic properties. If the temperature of the energy source is not constrained such as a naked flame or a high temperature oven then the outer surfaces of the foodstuff will rapidly rise well beyond any required processing temperatures and the product properties will change, e.g. browning of meat on a grill or burning of pastry in an oven. In a domestic or food service operation, one is dealing with single entities or small volumes of product and the use of labour to turn, move or otherwise control the rate of heat transfer can be used to control the ultimate properties.

In mass food production, the use of labour or manual intervention to control rate of heat transfer is more problematic and costly. In very high speed production it is impractical.

Consequently, energy transfer usually has an upper or lower limit in the form of temperature control. In a cooking operation, if the upper temperature is limited to say 122° C. (the temperature generally accepted as the minimum needed for effective food sterilization), then no matter how long the product stays in the heating chamber, it will (with a very few exceptions) never exceed 122° C. by more than a few degrees. The same constraints apply to cooling operations.

However, a second variable comes into play, namely dwell time. Excessive dwell time at elevated temperatures can significantly affect product properties as it will lead to protein denaturation, vitamin loss, flavor and texture changes, etc. Therefore, it is essential to maximize the rate of heat transfer for each product. The manner in which that can be achieved is also dependant on a number of variables including product composition, product particle size and size variation, viscosity, container shape, size, composition and dimension, volume, air to solid to solution ratios, headspace, etc. The measures taken for maximizing energy transfer will also vary according the energy transfer method.

For sterilization of food and/or extension of shelf-life, three major technologies have been developed, namely aseptic processing, retorting or continuous heating/cooling technology such as the Stork Hydrostat™.

A simple example, orange juice, will illustrate the different approach to temperature control each has developed.

With aseptic processing, the product is actively passed over or between heat plates so that the product temperature rapidly rises. The flow rate and the temperature differential are controlled so that virtually all the product is subjected to the same temperature and dwell time. The result is that the product is minimally processed and of the highest quality. However, this only happens if the product is homogenous and is effectively free of suspended solids. So processing of pulp free orange juice is effective but the presence of increasing amounts of solids will, because of the temperature of the heating plates cause the solids to denature, the organoleptic properties to change and the quality and uniformity to fall.

The retort process constrains the product in its (usually) final container and attempts to maximize heat transfer through optimizing the stacked product configuration and agitation. This agitation may be agitating the whole retort (U.S. Pat. No. 6,251,337) or the baskets within the retort (EP2177116) or some combination of both—although this latter option has yet to be demonstrated. However the distribution of energy within the retort chamber is not as consistent as with thin-film aseptically processed foodstuffs as, for example, outside products within a stack will heat up faster than ones within the centre of the core.

For those skilled in the art it is known that agitation will move the product within the container, thus improving the heat distribution. This can be achieved in many different ways including rotating food within a static container or pressure vessel, rotating the container, compartmentalized heating and/or cooling for multistage cooking cycles (U.S. Pat. No. 6,071,474).

However, the efficiency of such an operation will be increasingly limited by a whole range of factors such as variation in particle size, product composition and viscosity, container-to-container contact, stacking ratio and format. So, while agitation can improve the energy transfer rate in many products, it will have little effect on others. But the relatively limited size of the batch within the retort chamber makes agitation mechanisms, whether manual, semi-manual or automatic, a practical option.

The large-scale continuous sterilization/pasteurization technologies, such as the Stork Hydrostat™ and the FMC Sterimat™, present a totally different challenge. In these systems, very large volumes of product, often exceeding 1 million units per day, are continuously processed. While there are several variants of this type of technology, the process is essentially the same.

Product to be processed, usually in cans, glass jars or bottles, are loaded into product holders of various configurations. These holders are then passively pulled through a series of chain driven geared drives, through vertical chambers or towers, where each chamber has specific temperature and pressure settings. In the simplest set-up, the first chamber uses hot water to heat up the product to a temperature close to 100° C., the second chamber is a steam chamber where the use of hydrostatic pressure allows the temperature of the steam to rise up to around 125° C. while being constrained within the chamber by the adjacent water columns. The final chambers use cool or cold water to reduce product temperature and stop any further cooking activity.

The usually linear product orientation allows for a more consistent series of processing parameters than retort systems. The method of heating and cooling allows for the effective processing of product with significantly more solid content than an aseptic system. However, the sheer size of the system acts as an enormous energy sink/source and it is not easy to change any system parameters other than dwell time to modify processing conditions. Also, it is virtually impossible to increase throughput capacity because of the essentially constant processing parameters.

The relative slow product throughput speed, typically 6-10 m/m, minimize any product agitation while the typically linear and horizontal product orientation and minimal headspace within the containers further reduce the ability of contents to mix. The result is a process that consistently ensures that product is effectively sterilized but generally the product is of a lower quality than that produced by its aseptic counterparts.

A further issue is the relative inability for such a system to handle and process product in containers constructed of new more cost effective, energy efficient and environmentally friendly materials such as bowls, pouches and plastics such as bottles and yoghurt pots.

A final issue is flexibility in processing. The operating conditions of a retort system, although not optimally performance or cost effective, can be relatively easily modified to allow product to be either sterilized or pasteurized. Currently, continuous sterilizing systems can only be modified with great difficulty and cost. For example, to convert an existing hydrostat based sterilizing system to a pasteurizing system requires the conversion of the chamber/tower from a steam handling unit into a water handling unit.

The embodiments and preferred embodiments of this invention address all of these issues without altering the physical structure or operating principles of the existing system.

SUMMARY OF THE INVENTION

Definitions

In addition to the specific definitions described elsewhere within this application, for purposes of clarity, the following additional definitions are made.

'Accelerated' the reduced amount of time required for the present invention to process a foodstuff to a required processing state when compared with the time required for processing the same volume of same product to the same required processing state without the benefit of optimized orientation or agitation.

'Rate of Thermal Transfer' describes the speed (as measured by temperature change relative to dwell time) at which the temperature of the product and/or the product container rises or falls.

'User Designated Processing State' describes the degree of processing selected by the user compared with the degree of processing actually achieved by the system.

It is an object of the present invention to provide an apparatus and method for reducing the cooking time of a foodstuff in a controlled and predictable manner in an essentially fluid medium.

It is a further object to provide such reduced cooking time in a substantially continuous cooking or cooling process.

It is another object to provide an apparatus and method to improve the quality of such processed foodstuff.

It is yet another object to provide an apparatus and method to increase the throughput capacity of the cooking or cooling process.

It is a further object of the present invention to provide an apparatus and method that will allow a wide variety of food and drinks products, food and drink containers and packaging materials to be processed within the same system.

It is also an object of the invention to allow the apparatus and method to be designed in a flexible manner so as to permit foodstuffs to be processed by means of pasteurization or sterilization or other product stabilization method as preferentially defined by the user.

It is another object of the present invention to achieve all of the above stated objects of the invention with optimal energy efficiency and substantial reduced processing cost per unit.

It is a final aspect of the invention that all of the above stated objects of the invention can be used individually or in any combination within any suitable continuous or batch cooking and/or cooling processing system.

DETAILED DESCRIPTION OF THE INVENTION AND PREFERRED EMBODIMENTS

Figure 1B:
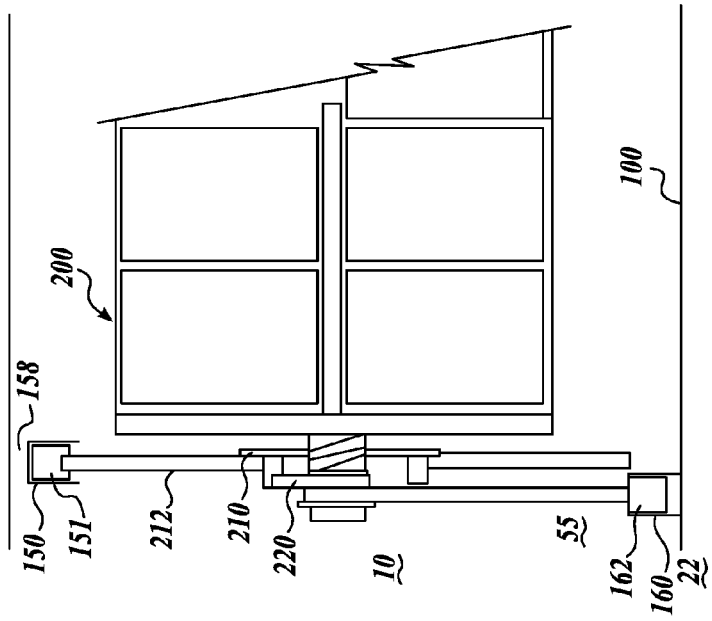
FIG. 1B shows the basic design of the product carrier rotation device-end view.

We will now describe the preferred embodiments of the present invention in more detail with reference to the drawings. It will become obvious to anyone skilled in the art that the embodiments herein described can be utilized in many different forms, variants and configurations and therefore the described embodiments are merely used to illustrate the principles of the invention and their potential range, scope and application. First we will address the problems associated with reducing cooking and/or cooling time and our inventions to achieve these effects.

It is obvious to anyone skilled in the art that in a continuous cooking and cooling system, providing the product remains consistent, i.e. the composition and constituents do not vary beyond the allowable limits of an accepted standard for that product and the amount of available energy (for heat or cooling as needed) exceeds the total consumption required by the process for the product volume passing through the system, then providing there is no change in any other variable, the amount of cooking and/or cooling needed to ensure effective processing (e,g, sterilization) will be related to dwell time in a consistent manner.

It is also known that the introduction of agitation into the process can accelerate heat transfer rates, again in a consistent way, provided the product composition and process conditions remain sufficiently constant. Rasmussen et al., (U.S. Pat. No. 4,990,347) describes how axial rotation of a can containing a viscous food product can accelerate cooking times. He refers to the continuous cooker as taught by Reimers et al (U.S. Pat. No. 3,927,976) but that system as detailed is not capable of generating axial rotation to the product. Veltman et al (U.S. Pat. No. 5,747,085) describe the rotation in a continuous rotary sterilizer but once loaded the cans rotate radially about their own axis as the continuous helix of the sterilizer rotates.

Menacci (U.S. Pat. No. 4,196,225) teaches a method whereby carts of assembled tins or bottles are fed into a rotary chamber, restrained and then the rotary chamber is rotated by means of a gear driven mechanism. However, while these batches of cans or bottles are rotated, the cans of the individual batch will not be subject to a consistent heat or cooling as the cans at the outside of the stack will be subjected to greater exposure to the available energy than those in the middle of the same stack.

However there is one further aspect to accelerating heat transfer rates that has received little attention and that is optimizing the orientation of the product container prior to and/or during its passage through the heating and cooling steps of the process. In virtually all current and previous product processing systems, the orientation of the product container has been almost exclusively determined by the mechanics of product transfer system selected. For example in a retort system, the containers are usually stacked in a vertical position relative to its main axis, while in continuous sterilizers systems the product is usually orientated in a horizontal position around its main axis.

We have surprisingly found that not only can we generate consistent and effective product container rotation to continuous cooking and cooling systems in general but with especial reference to Hydrostatic systems, we can also significantly optimize product quality and accelerate processing times, through some simple additions and modifications to the product carriers; such additions and modifications each produce an enhancement to the processing system. However, in combination, we have surprisingly found the improvements are both highly synergistic and positive.

Hydrostatic systems are essentially vertical in structure as they rely on the pressure generated by water columns to constrain the steam within the sterilization chamber/tower and to produce the necessary pressure to elevate steam temperature and more importantly achieve effective sterilization. This results in general motion within these towers being limited to passively upwardly and downwardly vertical interspersed with a small amount of horizontal movement as product moves from one tower to another. As a consequence, product agitation has been essentially limited to small amounts of radial movement, more specifically as the product advances from one tower to another or changes direction as it rises or falls within each tower. Until now it has not been possible to generate suitable additional movement within such systems and certainly not end-over-end product rotation.

While we have been able to generate the necessary rotational motion using a variety of mechanisms including helical or spiral drives/gears, secondary chain drives and interlaced gears, we have preferentially been able to generate such movement through the introduction of a simple apparatus to each carrier. In a preferred embodiment to the invention, the apparatus consists of a circular disc fixed between the end of the product carrier and the attachment of the product carrier to the moving chains that carry the product through the system. One disc is affixed to each longitudinal end of the carrier. Each disc rotates about an essentially fixed shaft at each end of the product carrier, this shaft also serving as a means of permanent or temporary attachment of the product carrier to the drive chain.

Said apparatus typically consists of repeating elements comprising

A circular plate (210) with a number of protrusions (arms) (212) radiating out from its circumference along the same plane. The number of these arms being a factor in the frequency and amplitude of each indexation.

A mechanism (220) adjacent to the circular plate to ensure that motion is both unidirectional and moves to completion for each indexation.

An assembly (230) adjacent to the circular plate to limit horizontal and lateral movement of the product carrier A linear strip (150) fixed vertically to one side of the tower wall (100). Each strip comprising a large number of recessed compartments of fixed dimensions (155) to receive and engage the distal ends of each of the protrusions of the circular plate.

A linear 'U' shaped strip without recessed compartments (160) and located vertically to the tower wall and diametrically opposite to the linear strip with recessed compartments.

Figure 1A:
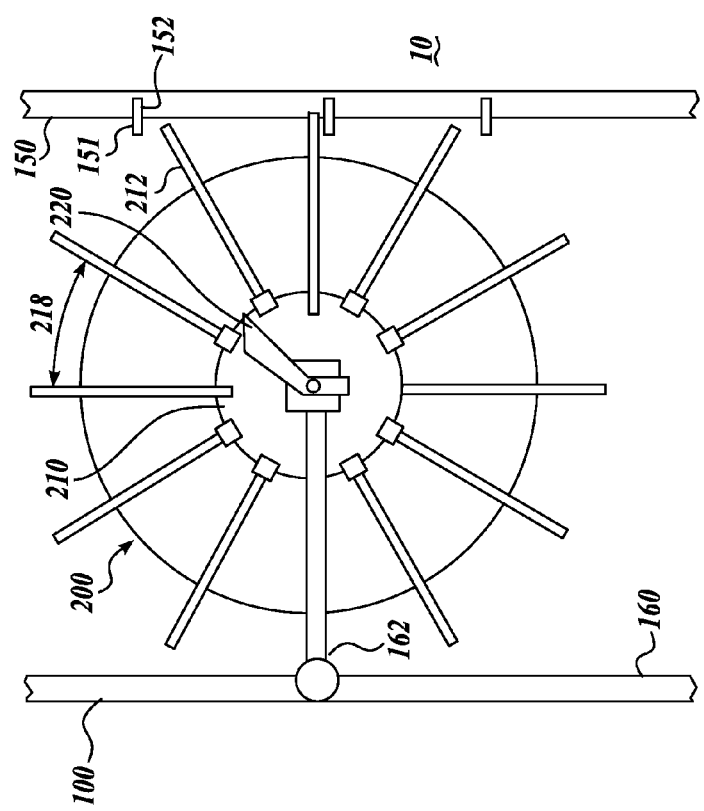
FIG. 1A shows the basic design of the product carrier rotation device-side view.

We will now describe one method of operation with reference to FIGS. 1A and 1B. The motion of the vertical drive chains (110) moves the product carrier (200) vertically up or down the tower (100). The upper (151) and lower (152) walls of each compartment of the fixed linear strip (150) protrude into the path of the radiating arms (212) of the circular plate. Once engaged, the vertical motion of the drive chain causes any engaged arm to initiate a partial rotation of the circular plate. This in turn initiates a partial rotation of the product carrier. The arc travelled by the engaged radial arm not shown) exceeds the arc between adjacent radial arms (218). This ensures that once initiated the partial rotation progresses to completion and the disc rotates sufficiently to allow the next radial arm to engage with the next protrusion on the fixed linear strip (150).

The locking mechanism (220) which can be any suitable design but is preferentially a unidirectional ratchet, similar to the escapement mechanism of a mechanical clock, ensures that not only is the motion consistent but also in a fixed direction, so the product carrier cannot counter-rotate. The 'U' shaped linear strip (160) engages the guide roller (162) and limits horizontal and lateral movement of the product carrier.

The materials used for the construction of the apparatus can be of any suitable for the conditions within the tower although, in a preferred embodiment, they are of stainless steel.

It will be obvious to anyone skilled in the art that when the drive chain changes from ascending to descending or vice-versa, the direction that the circular plates with protruding arms will travel will be opposite. A number of different configurations have been adopted to overcome this problem including but not limited to ensuring the protruding arms only engage when traveling in a defined direction and/or ensuring the circular plates each rotate in an opposite direction so that one plate engages as the product carrier moves up and the other as the carrier moves down.

However, in a preferred embodiment, we have fixed duplicate circular plates with duplicate guide rollers placed on opposite sides of the fixed shaft (202) to function as distance spacers at both ends of the carriers. Each circular plate also has their own unidirectional ratchet which disengages when its circular plate is not being driven by its attendant radiating arms. We have also affixed duplicate vertical strips to both ends of the tower walls such that each wall has one vertical strip with protrusions (150) and one 'U' shaped strip without protrusions (160). The physical spacing of these strips ensures that only the correct disc is engaged to generate rotation depending on the direction of movement of the drive chains.

We have also found that the roller and guide (162) are most effective in ensuring smooth rotation, irrespective of direction. This arrangement of the apparatus ensures that the construction can be both simple and relatively lightweight yet sufficiently robust to rotate the combined weight of the contents of a single product carrier, its weight (typically between 7 kgs and 15 kgs) and the friction generated by having to rotate the apparatus within a heat transferable fluid such as water.

Walden (U.S. Pat. No. 5,857,312) teaches that significant reduction in cooking and cooling times can be obtained by inducing sufficient agitation. This he has shown is a function of g force created within the can. He also teaches that a g force close to 1 (atmospheric pressure) will show variable reduction in cooking and/or cooling times, while g forces in excess of 1.25 g will produce substantial and predictable reductions in cook/cool times. Although not stated, it is assumed that this is due to the agitation created being sufficient to ensure adequate and continuous movement and mixing of the product within its container. Unfortunately, the method disclosed for generating the g force within a retort type cooker, i.e. rapid, reciprocal horizontal movement is not practical in a continuous, essentially vertical movement orientated Hydrostat system and would also be ineffective for almost any vertically-oriented product container. Neither does the teaching disclose the effect of such motion on products which comprise multiple components of varying sizes, viscosities and compositional ratios. The test material was a slurry of Bentonite whose physical properties could be compared to a product such as orange juice with some pulp content. Such rapid oscillation of cans is also unsuitable for many mixed component foodstuffs as it would induce unwanted material physical degradation in products such as beans in water, fruit in syrup or meat/vegetables in gravy or sauce; it would also accelerate oxidation reactions within the container and the foodstuff.

We have also surprisingly found that there is both an optimum agitation and an operational range for every product. While we have been able to demonstrate a number of practical methods to induce product rotation, we have also found there is a need to be able to control the frequency and amplitude of each agitation so as to optimize the system not only for each product while working within the physical and energy constraints of the Hydrostatic principles of operation but also each product container type.

We have been able to introduce a measure of control over both amplitude and frequency of rotation to the novel rotational mechanism previously described, through a number of simple design modifications/additions to the product carrier and the transport mechanisms. However, we have found that one approach provides the user with all necessary flexibility to any specific product/container combination and we include this approach as a preferred embodiment to this invention.

The number of times the protruding arms (212) affixed to the circular plate (210) engage with the compartmented vertical strip (150) will control the number of times the product carrier, and thus the frequency with which the individual product containers, move. Therefore by modifying or changing the total number of individual engagements will control the total number of product rotations per manufacturing cycle. This approach will eliminate the need to count product revolutions, as per Rasmussen (U.S. Pat. No. 4,990,347).

We have also surprisingly found that we can introduce some degree of control of the amplitude of the rotational response by controlling the length of time the protruding arms on the circular plate are in contact with the upper wall surfaces (151) of the individual compartments of the vertical strip. The greater the time of contact, the greater the arc the container is rotated per movement, the greater the degree of movement and mixing of the container contents.

The amplitude is controlled by a combination of varying the distance between adjacent upper surfaces of the compartmented vertical strip and the distance the circular plate is located relative to that vertical strip. Moving the circular disc closer to the vertical strip means the protruding arm stays in contact longer with the upper surface of the compartmented vertical strip.

The amplitude of agitation can therefore be controlled by adjusting the distance (158) the 'U'-shaped vertical strip (150) is away from the vertical wall of the chamber (100). This in turn presses against the product carrier guide roller (162). Because the product carrier primary drive is a vertical chain (110), this is deflected toward the opposing chamber wall and the protruding arms (212) are pushed further into the compartmented vertical strip (150), thus remaining in contact for longer and causing the product carrier to rotate further. However, because the length of the protruding arm will change, this will also introduce a capability to additionally control the speed of rotation. Conversely reducing the distance of the 'U' shaped vertical strip from its supporting chamber wall will have the opposite effect and reduce contact time and rotation speed.

Frequency of contact is controlled by modifying the number of upper surfaces of the vertical strip that come into contact with the protruding arms of the circular plate. In theory this can be an infinitely variable number. In practice, we have found that 3 or 4 different patterns are sufficient for most products.

In a preferred embodiment, the number of upper surfaces that are protruding is controlled by simple vertical cam-shaft (180) which extends approximately every 5 meters of the tower. The cam, which is essentially square, has 4 distinct, defined patterns of raised lobes on each surface and rotating this cam a quarter turn will expose a different pattern. The upper surfaces of the individual compartments of the vertical strip have extended shaped pieces (153), preferentially of metal and more preferentially, made of sprung steel. When a cam lobe (181) presses against it, the upper surface is pushed upward and inward, thus increasing the distance between the upper surfaces of the compartmented vertical strip and the protruding arms of the circular plate, preventing contact or minimizing engagement and thus preventing or limiting rotation.

We will now describe those aspects of the invention, and our preferred embodiments, related to expanding the types of container that can be processed through a hydrostatic sterilizing system with reference to FIGS. 2A-2D.

When the first hydrostatic sterilizers were introduced some 40 years ago, glass bottles and jars and metal cans were the only containers that could withstand the combination of temperature and pressure exerted on them by the system. The carriers to hold the product and passively pass it through the system were designed to load and hold bottles, jars and cans, predominantly in a horizontal position. They were also rigid and self-supporting. Since then there has been a raid expansion in the number and types of containers that can be sterilized under hydrostatic conditions.

In the last decade or so there have been major changes in manufacturing practices in many sectors of the food and drink industries. One of the most important has been the increase in the number of manufacturers that produce as many products units as the large monoculture producers, but that production volume is spread over several or many different product types. This requires that manufacturing systems need to be able to frequently change operating conditions or equipment, e.g. pack shape, pack materials and package sizes when product types change.

Unfortunately conventional high capacity continuous hydrostatic systems while ideal for monoculture production, i.e. large volumes (400+ units per minute) of single products such as 450 g or 750 g cans of beans or macaroni in cheese sauce, are much less able to accommodate product in different containers, even if it is the same product. This is primarily due to the design of the product carrier and the way each carrier is linked to its preceding and following carriers.

The conventional can is typically a consistent size or, better still from a processing perspective, a consistent shape; for example, a 225 g can is half the length of a 450 g can but same diameter; a 750 g can is same length as a 450 g can but different diameter. As a consequence, the same product carrier system and apparatus can accommodate and be used to process these different sized, same shaped cans with no/minimal changes.

Also, because of the capacity of the system and its continuous processing methodology, it takes a considerable time and some cost to reset the system to accommodate a different product. Being able to accommodate both different products and different containers would significantly increase system flexibility and the potential market that could use such systems.

New packaging materials such as pouches or bowls are far from consistent in shape and size, compared with cans, as manufacturers use unique shapes as a means of product identity for the customer. Also, while cans, jars and bottles are rigid and consistent, bowls and particularly pouches are much less so. Therefore the carrier for such products needs to be able to accommodate all these variations while also being able to achieve rapid and effective loading and unloading of said containers from a continuous system; essential for high throughput capacity systems.

A further problem for multiple product systems is a requirement to rapidly change carriers to accommodate a variable processing schedule and thus requiring not only rapid but frequent changes. While practical for batch retort-based systems, it has so far not been possible with continuous systems. High volume continuous sterilizer systems, while well-established as 'the process of choice' for large volume monoculture product manufacturers, have had limited appeal to high volume, multiple product manufacturers. The cumulative consequence of all these issues is limited market appeal and limited market penetration in new markets and new applications.

Because hydrostatic sterilizers are large volume, continuous and with no or minimal buffer capacity, it is rarely possible to change processing conditions until all product has, at least, exited from each individual tower/chamber. Modern lightweight packaging frequently processes faster than product in cans or jars. In such cases, processing speeds as well as conditions need to be modified. To undertake such tasks most efficiently additionally requires specialist scheduling, sequencing and process optimization. (The benefits of such an approach are subjects of a further separate sister application)

While investigating solutions for all this issues, we have surprisingly found that virtually all can be resolved through the development of a novel but relatively simple solution. In the past, manufacturers of such systems have attempted piecemeal solutions which involve the development of specific product 'adaptors' that can be fitted or work with existing process carrier technology. These adaptors have taken many forms such as cartridges, cassettes, liners, packers, etc. However, very few have been successful or entirely effective.

Obviously a permanent solution such as a carrier specifically designed and developed for a pouch, bowl or pot is the ideal answer. However that requires changeover time, which in turn is lost production time, as well as additional labor, overheads, capital costs and resources—all of which increase unit manufacturing costs.

Another potential solution, using two different product carriers, has the drawback that, at any one time, because of different processing condition requirements, only one carrier can be used thus reducing the throughput capacity. We have shown that controllable and adaptable product rotation not only improves product quality, it also reduces processing time and thus increases throughput capacity.

Figure 2C:
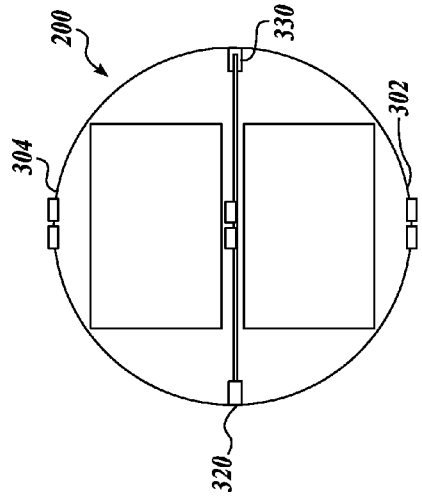
FIG. 2C shows the roller arrangement for cans loaded across the carrier main axis.
Figure 2D:
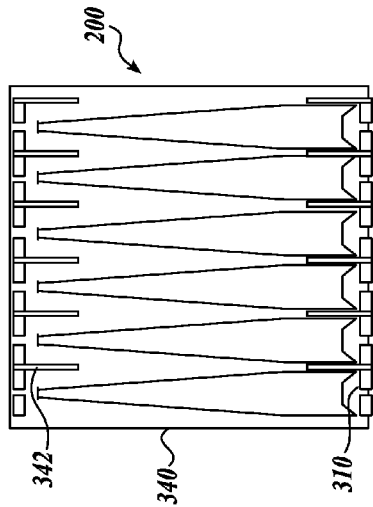
FIG. 2D shows a side view of product carrier showing configuration for loading and processing pouches and bags.

Designing and affixing two or more product carriers configurations, e.g. (pouches and cans) on a moveable (rotatable) carousel with a fixed central core has shown itself to be a novel but ideal solution providing it is capable of product rotation (See FIG. 2C). However, what we have surprisingly found is designing a product carrier capable of holding and processing more than one product and/or package type is a far more practical and cost effective solution.

While the potential permutations of product and product container are almost infinite, we will describe the detail of two variants of a two product type carrier, namely for cans and 'plastic' pouches, but it will be obvious to anyone skilled in the art that such an invention can be adapted easily to process many more combinations of products as well as develop configurations capable of conveying 3 or more different product container types through the sterilization process. Therefore the examples quoted are purely illustrative and in no way limit the use of the invention.

Figure 2A:
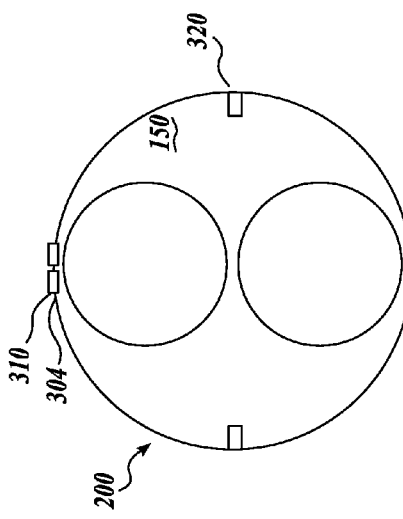
FIG. 2A shows configuration of top and bottom rollers for conventionally loaded cans.
Figure 2B:
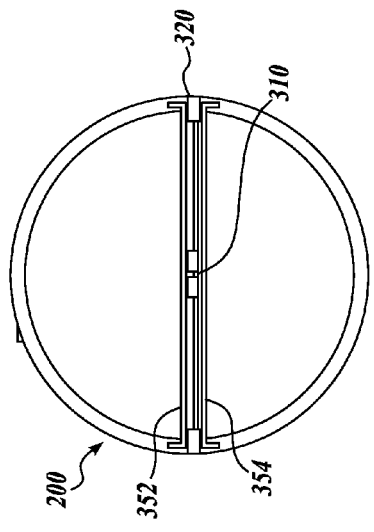
FIG. 2B shows carrier configuration for loading cups and bowls.
Figure 3A:
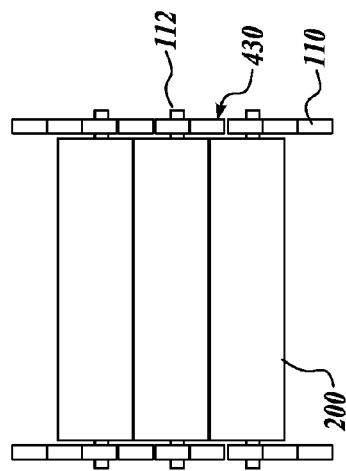
FIG. 3A shows conventional coupling of product carrier to chain drives.
Figure 3C:
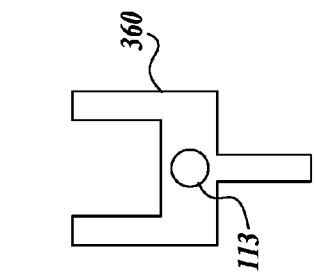
FIG. 3C shows a connector of the modified coupling for automatic decoupling.
Figure 3B:
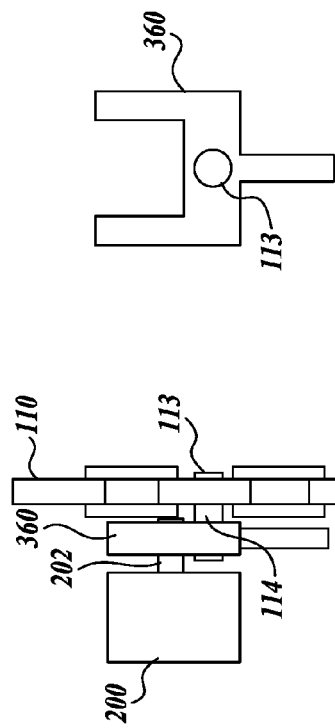
FIG. 3B shows modified coupling for automatic decoupling.
Figure 3D:
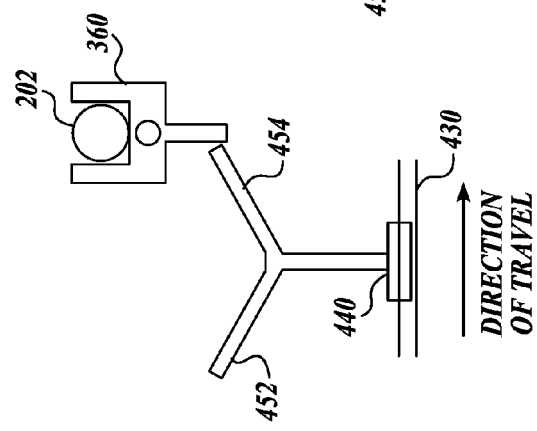
FIG. 3D shows configuration for carrier disengagement from chain drive.
Figure 3E:
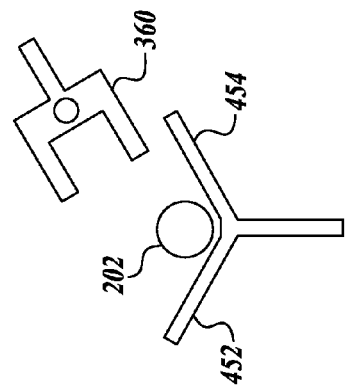
FIG. 3E shows the completion of the carrier disengagement process.

Existing can carriers for hydrostatic sterilizer systems tend to be semi-open structures with a top and a bottom to hold the cans and one or more side bars to prevent cans from falling as the carrier moves over the top or bottom walls of each chamber (FIG. 2A). They are usually made more rigid by interlocking with, or at least touching, adjacent carriers. They can be loaded from the side or from the back. In larger systems they can also be in pairs.

Such a structure and configuration makes product rotation virtually impossible. However, as we have surprisingly found, the rotation unit previously described can be easily incorporated in a single or duplex carrier structure and the ratchet mechanism together with the roller and guide combination, make the need to interlock adjacent carriers unnecessary. Therefore all the benefits of rotation are available to existing users who require no product packaging flexibility.

Firstly, we have been able to demonstrate that modifying the design and configuration of the existing can carrier will allow it to carry pots or bowls. Cans are usually loaded along their longitudinal axis by pushing them in as a sequential monolayer or preformed as a 'stick' of up to 16/18 cans, again aligned end-to-end along their longitudinal axis and loaded from the side. By the very nature of their shape and material composition, they easily slide. Pots and bowls are not so easy to load.

Although there are many different ways to reduce friction to ease product loading, we have surprisingly found that, as a preferred embodiment, the simple addition of feed rollers (310) to the lowest point of the carrier base (302) and highest point of the carrier top (304), pots and bowls can be loaded easily. Whether the product is loaded from the rear of the carrier or from the side then, at all times the feed rollers are parallel to the direction of loading.

Because pots or bowls tend to have a smaller volume and/or lower profile than cans, it is often necessary to stack product at least two units high. Providing the stack of two or more units fits the cross sectional space of the carrier (200) then not only will the product be effectively sterilized, it will also be equally easy to unload.

However, there is an additional issue that has to be addressed. Those skilled in the art will know that one of the major factors that effects cooking and cooling time is the area to volume ratio. The greater this ratio the faster energy will transfer and the quicker will be the cook or cool time. Stacking product significantly reduces surface area relative to volume. For example, a 15 cm diameter bowl, stacked top to top will have in excess of 33% of its total surface area unavailable for direct contact with the heating or cooling medium. This will reduce heating efficiency by almost 50%. Similarly a yoghurt pot 5 cm diameter and 7.5 cm high, stacked top to top, will expose 17% less surface area and will reduce heating efficiency by some 27%.

The addition of simple metal flanges or other similar structures (320) on either side of the interior surfaces of exterior wall of the carrier at a point adjacent to its maximum diameter to function as dividers/separators, will keep the stacked product sufficiently separated to allow optimal processing. The thickness (vertical height) of these flanges will largely be dependent on the product container mix to be processed; typically said flange thickness will be in the range 0.1 cm to 10 cms. In a preferred embodiment, the range is 1.5 cm to 2.5 cm. The width of the horizontal surface of the flange is nominal but in practice 0.5 cm to 1.5 cm appear optimum. In any case, the flanges need to be so dimensioned as to not hinder the loading or unloading of largest cans. For example, a typical 750 g can has a diameter of 10.5 cm; similarly a typical ready-meal bowl has a top lid diameter of 15 cm. Therefore the maximum intrusion of each of the flanges into the cavity of the product carrier is 2 cm.

In a further preferred embodiment, the flat metal flanges are replaced with roller assemblies of similar dimensions (330) with the direction of rotation of the roller being the same as the direction of product loading.

Additionally, we have found that when loading any non-can product that has a diameter dimension greater than the largest can the carrier is designed to hold, loading the stacks separately will ensure an error-free and damage-free load. This is best achieved by loading the lower stack of product, then rotating the product carrier (200) ½ turn and loading the second stack. The flanges, while maintaining adequate spacing during loading and unloading, also act as safety bars to restrain the product during rotation and transfer between chambers/towers.

However, a somewhat different approach is needed for a product carrier designed to carry pouches, including 'stand-up' pouches, as well as cans.

Firstly, because of the typical dimensions, surface area to volume ratio and overall wedge shape of a pouch, they ideally need to be side loaded. And, unlike a can, they are more effectively loaded in an essentially vertical position. Furthermore, unlike cans and jars, despite the weight of product within the pouch, the much larger surface area to volume ratio of a pouch tends to cause the pouch to float. Consequently, pouches need to be minimally constrained within the carrier in order to prevent this.

With the typical length of a pouch around 20-23 cms, this is significantly longer than a 450 g or 750 g can (11.5 cm), thus requiring a total clearance of at least 28 cms to rotate the carrier. Such a space will also accommodate 2 standard cans stacked vertically.

The roller assembly previously described for side loading horizontal cans adequately handles vertical cans whether single or double stacked, with or without spacers. Vertical pouches can similarly loaded by this or any other suitable mechanism that handles the product packages.

In a preferred embodiment, because pouches and bags are more flexible than a can or a jar, we have found that for ease and speed of loading and unloading, a simple compartmented structure (the former, 340) comprising repeating elements of metal spacers (342) separated by a width dimension at least equivalent to the width of the filled pouch to be treated, allows a carrier-load of pouches to be preassembled prior to the carrier being presented and then quickly loaded into the carrier.

Depending on the physical properties of the filled containers, the former does not always need to be loaded with the pouches into the product carrier. However its main function is to retain order for easier subsequent handling on completion of heating and cooling treatment. In practice, we have found that retaining the former additionally helps to constrain and retain the pouches in the product carrier during rotation and transport through the hydrostatic sterilizer.

With the product carrier assembly already enclosed on 3 sides, the 4$^{th}$ side of the carrier, with or without the former, can be enclosed by any suitable method. In a further embodiment, the installation of two simple metal safety bars (352 and 354), mechanically pivoted at the top and bottom external surfaces of the product carrier and meeting close to the midpoint of the carrier effectively serve this function. The width of these bars being sufficient for purpose.

The final object of this invention is increasing the flexibility of the process which we will now describe with reference to FIGS. 3A-3E.

We have previously described how the hydrostatic sterilizer was originally designed to handle and sterilize large volumes of product in rigid containers such as cans, jars and bottles. Since the development of that original design, there have been very significant changes to the way food and drink products are processed and stored.

Firstly, consumers have demanded better quality food and drink products than those produced by sterilizers whose original primary function was to produce microbiologically safe product with a long shelf-life without the need for refrigeration which was poorly available and expensive at that time.

There has subsequently been a major expansion in foods and drinks that have been subject to a much less severe heating and cooling processes but require at least some refrigeration to extend shelf-life. These are products that have been pasteurized rather than sterilized.

There has also been a significant development of foods which, because of their low pH, (naturally occurring or recipe driven), so-called low acid food, in combination with a mild heat treatment, have the necessary shelf-life without refrigeration. The development of alternative packaging materials has further expanded the type, number and variety of such shelf-stable products.

Consequently, apparatus and methodologies have been developed which specifically address these less severe processing requirements. Aseptic processing and retorting are typical examples.

Increasing the flexibility of the Hydrostatic system to undertake some or all of these alternative processing methodologies would significantly increase its commercial appeal. It is obvious to anyone skilled in the art that the ability to process a wider range of product can be achieved by varying the processing conditions. Pasteurization requires the input of heat and pressure but to a much lesser degree than sterilization, while shelf-stability, especially for fruit, vegetable and drinks products requires the same conditions as pasteurization but a further magnitude less severe.

While an aseptic process can never achieve the level of processing achieved by a Hydrostatic sterilizer, the converse is theoretically possible. Reducing temperature and pressure and/or decreasing processing time within a continuous sterilizer such as the Hydrostat, would allow a product to attain pasteurization rather than sterilization conditions. However, because of the size, volume, form and function of continuous systems, it would involve considerable time, resources and loss of energy to do so.

For example, loss of steam pressure would cause the steam tower to lose its pressurization and would require very considerable energy input to re-establish it; there would also be considerable operational downtime and cost.

The types of continuous hydrostatic cookers are well documented by Reimers et al (U.S. Pat. No. 3,927,976) and Veltman et al (U.S. Pat. No. 5,747,085). While all the examples teach a similar approach to cooking and cooling, they teach different methods of passing the product through the system to achieve the required level of processing, ranging from containers with stacked product (Hunter, U.S. Pat. No. 1,419,139) to products arranged in single rows (Yawger, U.S. Pat. No. 3,469,988), or sticks (Bogaard, U.S. Pat. No. 4,116,117) and from continuous feeds (Van der Winden, U.S. Pat. No. 2,806,423) to transferable baskets (Mencacci, U.S. Pat. No. 3,478,677).

Also apparent, as taught by Reimers et al, (U.S. Pat. No. 3,927,976) is that all of these systems are designed for continuous sterilization and gentle movement of product through the system without agitation.

We have surprisingly found that through simple mechanical modifications and without any change in the form and/or function of the continuous sterilizer except for throughput rate, we can achieve effective pasteurization while retaining full sterilization capabilities within the same system.

In the typical continuous sterilizer, an endless flow of product is sequentially carried through all the chambers of the system. Once the product enters the system, because of the continuous (usually) chain feed, there is no mechanism to permit any processing segment to be avoided or eliminated.

U.S. Pat. No. 3,927,976 teaches that the drives need not be continuous and introduces a secondary chain drive that carries the individual baskets of stacked product through the sterilizing chamber. However it also teaches that the rate of progress of product through the steam tower needs to be at a slower rate than those entering and leaving the rest of the system. So within a continuous chain-driven system that is impractical.

One of the primary aspects of the current invention is the introduction of a mechanism to make the continuous passage of product through the system discontinuous. A preferential embodiment is that such discontinuity is selective.

A further embodiment is to achieve selective discontinuity without physically altering the continuous chain feed and/or the continuous nature of the process and operation.

A final embodiment is to enact selective discontinuity while permitting the previously described, infinitely variable, user selective product rotation in a wide range of product and packaging types.

We have previously described how the form of the product carrier can be modified to introduce the function of rotation with variable amplitude, frequency and speed through a novel adaptation. We have further described how we can modify the form of the product carrier in a further novel manner so as to allow a very wide range of product packaging to be processed through a continuous sterilizer.

A final novel element to this invention will take that increased range of product packaging, improved product quality and enhanced processing capacity and introduce the simultaneous ability to expand the range of processing capability to include pasteurization and other less severe food treatment methodologies.

It is well-known that pasteurization is a less severe type of processing than sterilization which, while extending the shelf-life of foodstuffs and drink, does so to a lesser degree than sterilization while producing a finished product of, usually, higher organoleptic, physical quality and higher value.

To achieve this in a continuous system of the hydrostatic type, where significantly accelerated chain speed is difficult to achieve, requires bypassing the sterilization leg. However, the major challenge is how to effectively make a continuous system discontinuous, without structural altering the system configuration.

The modified structure and configuration of the product carrier to include rotation, lends itself to such discontinuity. In order to include rotation, the means of connection of the product carrier to the drive chain has been altered from the original fixed connection. Further modification allows that connection to be a mechanical connect-disconnect coupling.

A typical configuration is shown in FIGS. 3A-3E. In the original continuous processing configuration, the product carrier (200) is directly fixed to the drive chains (110) with a rigid coupling (112) capable only of swiveling about its own Y-axis. In order to become easily disconnected, the configuration is modified. The coupling between the drive chain and product carrier is fixed at the end proximal (113) to the drive chain but retains its ability to swivel as previously. The distal end of the coupling (114), which connects with the carrier, is a 'U' shaped, partially open, free-moving metal connector (360). (As the shape is preferentially a 'U' shape with a single extension projecting downward from the base of the 'U', hereinafter we will refer to it as a 'Y' shape). The length, width and depth dimensions of the 'Y' shape are dependent upon product carrier configuration. The distal end of the product carrier is a plain shaft (202), preferentially round, which slots into the 'Y' shaped connector. The shaft is free to move about its own axis, a necessary property to allow product carrier rotation to occur. While it has not been found necessary to include any locking device, such as a spring, clasp or cover to the coupling to prevent unwanted or unnecessary disengagement (because of the combined weight of the carrier and product containers and the relatively low speed of the primary chain drive keep the product carrier correctly orientated at all times), a simple mechanically pivoted cover or similar locking device can be fixed as needed to the 'Y' shaped connector to provide additional security.

At the base of the sterilization tower (100), a simple, variable speed gear drive is mounted outside the tower with the position of this drive being close to the in-feed path of the primary drive chain inside the tower. A direct drive shaft protrudes into the tower across its width. At either end of this drive shaft are single fixed cogs. A continuous chain (430) is connected to each fixed cog and a second cog mounted on a free-running, non-driven drive shaft of similar dimensions, the location of this second shaft being close to the out-feed path of the primary drive chain inside the tower. Metal straps with limited flexibility (440) are fixed, in parallel, to the chains (430) at defined intervals. Simple bracing bars span the gap and overlap between the two chains. Two arms (452 and 454), preferentially made of sprung steel, radiate outward in the direction of the sterilizer wall at an obtuse angle and two arms radiating out at an acute angle are fixed to the 'L' shaped metal straps in the form of a 'Y'. These form part of the disengagement/reengagement mechanism.

Fixed to the base of the in-feed and out-feed outer walls of the sterilization tower are two fixed metal 'L' shaped brackets (460). These form another part of the disengagement and reengagement mechanism.

A typical mode of action for engagement and disengagement is as follows. As the product carrier completes the descent of the heating tower and starts to enter the sterilization tower, the arm of the broken 'Y' connector contacts the protruding base of the fixed 'L' bracket on the sterilization wall. As the chain drive continues to slowly pull the product carrier into the tower, the 'U' shaped bracket slowly rotates and the product carrier is pushed from its coupling and, guided by the radiating arm of the metal strap, is picked up by metal brackets, fixed to the rotating secondary chain drive.

The now dismounted product carrier is picked up by the 'L' bracket and transferred across the base of the sterilization tower by the gear drive which is synchronous with the speed of the primary drive chain. The remounting of the product carrier is a reverse of the dismount procedure. The leading arm affixed to the 'L' bracket engages with the 'Y' shaped mounting connector of an empty product carrier position on the primary chain. The forward motion of the leading arm and the downward motion of the primary chain causes the product carrier shafts to re-engage with the product carrier connector and the product carrier is again picked up by the primary chain and continues into the first cooling tower.

The product within the product carrier has been heated to pasteurization temperatures in the heating tower, by-passes the sterilization tower and now starts its cooling cycle in the cooling tower thus completing an effective pasteurization cycle within the continuous sterilization tower.

It is obvious to anyone skilled in the art that such a transfer process can be accomplished using many different methods and apparatus. The novel element is achieving the discontinuity of treatment within a continuous treatment system without affecting the system's primary form or function.

It will also be obvious to those skilled in the art that such an invention can be used to achieve other different types of processing such as product stabilization where the application of more limit amounts of heat will ensure that the product being processed will not reach pasteurization temperatures but will reach a temperature sufficient to eliminate enzymes and oxidation reactions within a product thus preventing further product deterioration. An example of this type is the blanching of beans and peas.

The ability to initiate discontinuity within the continuous processing system can be used in a variety of processing permutations. A yet further but different example is the capability to bypass the heating step of the process and moving the product directly into the sterilization step will allow products that may that require surface heating or surface sterilization or surface pasteurization to be processed. Typical examples would be nuts and grains or meat cuts or meat primals which may be essentially sterile, except for any exposed or cut surfaces.

In a still further example, previously cooked product may require additional chilling. By installing the bypass apparatus for both the heating and sterilizing legs will allow additional chilling to occur.

Consequently, the examples given are merely illustrative of the invention capabilities and flexibility, and as such are not meant to limit its scope.

EXAMPLES

Example 1

454 g cans of beans in sauce were randomly selected from a commercial production line after filling but before lidding.

Small standalone data loggers were inserted into the cans, some adjacent to the inner wall of the can, others in the middle of the foodstuff at a distance furthest from the can wall. The cans were sealed in the normal manner, physically marked for easy identification and inserted horizontally into a standard product carrier. They were then subjected to normal sterilizing conditions without rotation of the product.

After completion of the processing cycle, the cans containing the data loggers were removed from the line, the data loggers removed and the data recovered.

This procedure was then repeated under identical conditions with the exception that the product was rotated (end over end) while within the product carrier at a rotation rate of once per 5 m. This equated to a total of 8 rotations while in each of the heating tower, the sterilization tower and the cooling tower.

It was found that the rate of cooling (as measured by the time needed to achieve a 20° C. change in temperature) in the rotated can (4.59 min) was significantly faster (74%) than the non-rotated can (7.97 min). Similar improvements were found in rates of cooking Example 2

500 ml cans of orange juice with some pulp were prepared. The same data loggers as used in Example 1 were used in this example. Because the orange juice was not viscous the data loggers were randomly placed. It was assumed they would move around the interior of the cans as the product moved through the system. They were set to a logging rate of 6 per second as this was expected to give a good measure of temperature profile within the can as the loggers moved.

The cans were allowed to move through the heating tower (with a water temperature of 81° C. at the entrance to the tower, 90° C. at the top of the inlet leg and 94° C. at the bottom of the exit leg), without rotation. After exiting the heating tower, the dismount mechanism was activated so that the cans did not pass through the sterilization tower but moved directly to the first cooling tower.

After completion of the processing cycle, the cans containing the data loggers were removed from the line, the data loggers removed and the data recovered.

This procedure was then repeated under identical conditions with the exception that the product was rotated (end over end) while within the product carrier at a rotation rate of once per 5 m. This equated to a total of 8 rotations while in both the heating tower and the cooling tower.

Examination of the data showed that all product easily achieved pasteurization conditions (a minimum of 15-20 seconds at 72° C.). Rotated product reached these conditions 23%-31% faster than non-rotated product. It is calculated that the combination of product rotation and pasteurization within the continuous sterilizing system would permit continuous product pasteurization at a rate close to twice that for continuous sterilization.

The invention claimed is:

1. A method for processing foodstuff products packaged in a foodstuff product container, the processing occurring within a continuous heating and cooling system, the system having a heating stage, a sterilization stage, and a cooling stage, the method comprising:
    removably coupling product carriers to a conveyor for traveling through at least one of the heating stage, the sterilization stage, and the cooling stage, the product carriers capable of holding foodstuff product containers of differing materials, shapes, and sizes;
    positioning rotator protrusions on a strip within the heating, sterilization, and cooling stage(s) through which the product carriers are conveyed;
    coupling a rotator apparatus having protruding arms to the product carriers;
    differentially selecting one or more individual stages of the continuous heating and cooling system for processing the foodstuff products;
    conveying the product carriers through the selected stages;
    rotating the product carriers about an axis as the product carriers are conveyed through the at least one of the heating, sterilization and cooling stage(s) by the conveyor by engaging the protruding arms with the rotator protrusions positioned within heating, sterilization and cooling stage(s) through which the product carriers are conveyed;
    orienting the foodstuff product container within the product carriers in a manner that exposes the surface area of the foodstuff product container to facilitate thermal energy transfer from a thermal transfer media to the foodstuff products;
    controlling the rotation frequency of the product carrier during conveyance through the selected stage(s) of the continuous heating and cooling system by altering the number of engagements of the protruding arms of the rotator apparatus with the rotator protrusions within the selected stage(s) of the continuous heating and cooling system; and
    controlling the rotation amplitude of the product carrier during conveyance through the selected stage(s) of the continuous heating and cooling system by altering the distance between the strip and the axis, thereby altering a contact time of the protruding arms of the rotator apparatus with the rotator protrusions within the selected stage(s) of the continuous heating and cooling system,
    wherein the foodstuff products within the foodstuff product container are processed to facilitate the foodstuff products reaching a predetermined level of product stabilization, product quality, and microbial safety without modification to the stages of the continuous heating and cooling system.

2. The method according to claim 1, wherein the rotation of the product carriers causes agitation of the foodstuff products within the foodstuff product container, wherein the agitation is controlled through variation in one or more of the amplitude of rotation and frequency of rotation of the product carriers.

3. The method according to claim 1, further comprising the step of bypassing travel of the product carriers through non-selected stage(s) by decoupling the product carriers from the conveyor.

4. The method according to claim 3, wherein bypassing the non-selected stage(s) is achieved by decoupling an individual product carrier from the conveyor before the individual product carrier enters the heating, sterilizing, or cooling stage to be bypassed, moving the decoupled individual product carrier past the non-selected stage without entering the non-selected stage, and subsequently re-coupling the decoupled product carrier to the conveyor.

5. The method according to claim 1, wherein a required temperature of the foodstuff product for the heating, sterilization, or cooling stages is achieved by controlling at least one of a dwell time and a rotation speed for the product carriers within the heating, sterilization, or cooling stages.

6. The method according to claim 1, wherein the predetermined level of product stabilization, product quality, and microbial safety results in a foodstuff products state that requires less thermal processing than a sterilization process.

7. The method according to claim 6, wherein the predetermined level of product stabilization, product quality, and microbial safety results in a pasteurized foodstuff products state.

8. The method according to claim 1, wherein the continuous heating and cooling system is a hydrostatic sterilization system.

9. The method according to claim 8, wherein the hydrostatic sterilization system comprises a plurality of vertically elongated chambers.

10. The method according to claim 1, wherein the rotator apparatus includes a locking mechanism configured to prevent counter-rotation of the product carriers.

11. A method for processing foodstuff products packaged in containers of differing materials, shapes, and sizes using a hydrostatic system comprised of a plurality of vertically elongate chambers for heating and/or cooling the foodstuff products, the method comprising:

removably coupling product carriers to a conveyor for traveling through the vertically elongate chambers, each product carrier capable of holding at least one container;

positioning rotator protrusions on a strip mounted a distance from a wall of the vertically elongate chambers through which the product carriers are conveyed;

coupling a rotator apparatus having protruding arms to each product carrier;

differentially selecting one or more of the vertically elongate chambers of the hydrostatic system for processing the foodstuff products;

conveying the product carrier through the selected vertically elongate chamber(s);

rotating the product carrier as the product carrier is conveyed through the vertically elongate chamber(s) by the conveyor by engaging the protruding arms with the rotator protrusions positioned within the vertically elongate chamber(s) through which the product carriers are conveyed;

orienting the container(s) within the product carrier in a manner that exposes the surface area of the container(s) to facilitate thermal energy transfer from a thermal transfer media to the foodstuff products; and controlling the rotation frequency of the product carrier during conveyance through the selected vertically elongate chamber(s) by altering the number of engagements of the protruding arms of the rotator apparatus with the rotator protrusions within the selected vertically elongate chamber(s); and controlling the rotation amplitude of the product carrier during conveyance through the selected stage(s) of the continuous heating and cooling system by altering the distance between the strip and the wall, thereby altering a contact time of the protruding arms of the rotator apparatus with the rotator protrusions within the selected stage(s) of the continuous heating and cooling system, wherein the foodstuff products within the container are processed to facilitate the foodstuff products reaching a predetermined level of product stabilization, product quality, and microbial safety without modification to the plurality of vertically elongate chambers of the hydrostatic system.

12. The method according to claim 11, further comprising the step of bypassing travel of the product carrier through non-selected vertically elongate chamber(s) by decoupling the product carrier from the conveyor.

13. The method according to claim 12, wherein bypassing the non-selected vertically elongate chamber(s) is achieved by decoupling an individual product carrier from the continuous conveyor before the individual product carrier enters the vertically elongate chamber(s) to be bypassed, moving the decoupled individual product carrier past the non-selected vertically elongate chamber(s) without entering the non-selected vertically elongate chamber(s), and subsequently coupling the decoupled product carrier to the continuous conveyor.

14. The method according to claim 11, wherein the rotation of the product carrier causes agitation of the foodstuff products within the foodstuff product container, wherein the agitation is controlled through variation in one or more of the amplitude of rotation and frequency of rotation of the product carrier.

15. The method according to claim 11, wherein a required temperature of the foodstuff product for the predetermined level of product stabilization, product quality, and microbial safety is achieved by controlling at least one of a dwell time and a rotation speed for the product carrier within the plurality of vertically elongate chambers.

16. The method according to claim 11, wherein the predetermined level of product stabilization, product quality, and microbial safety results in a foodstuff products state that requires less thermal processing than a sterilization process.

17. The method according to claim 16, wherein the predetermined level of product stabilization, product quality, and microbial safety results in a pasteurized foodstuff products state.

18. The method according to claim 11, wherein the rotator apparatus includes a locking mechanism configured to prevent counter-rotation of the product carrier.

* * * * *